United States Patent Office 3,351,455
Patented Nov. 7, 1967

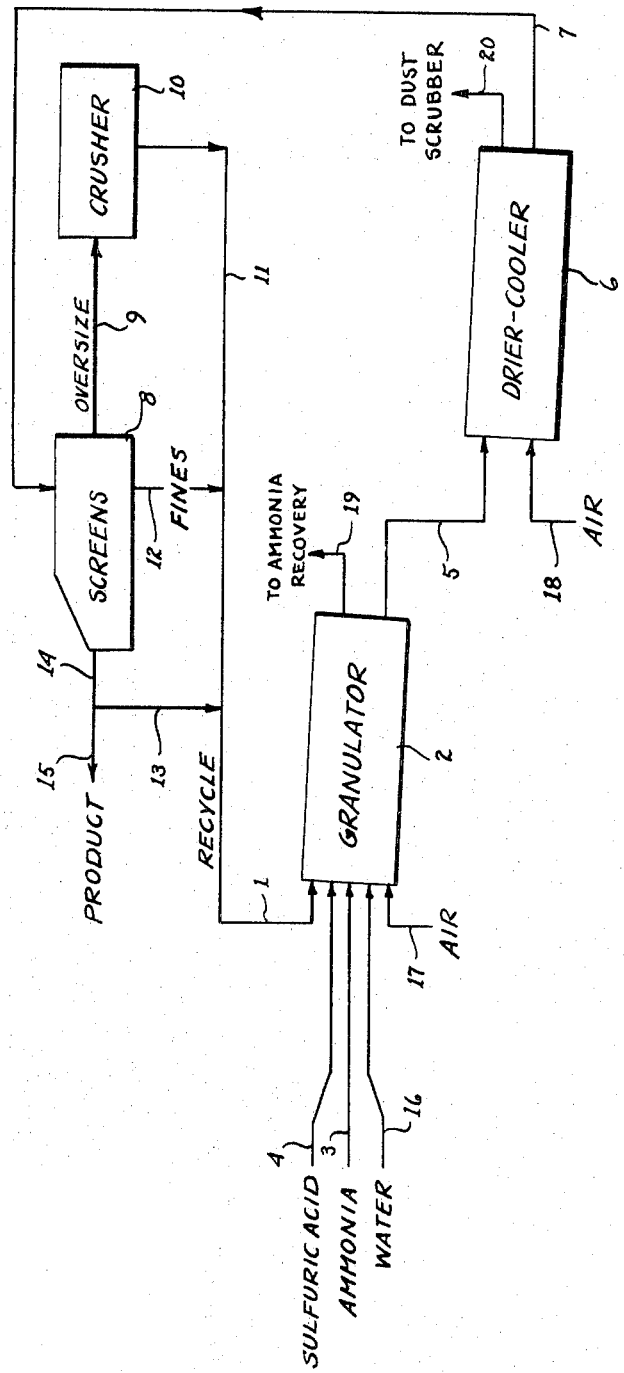

3,351,455
AMMONIUM SULFATE-AMMONIUM BISULFATE
FERTILIZER AND METHOD OF MAKING
Walter L. Burns, Chandler, Ariz., assignor to
Arizona Agrochemical Corporation
Filed Aug. 28, 1964, Ser. No. 395,107
8 Claims. (Cl. 71—61)

This invention relates to an improved fertilizer process, more specifically to the preparation of a granular, free-flowing ammonium sulfate product in a continuous process which is characterized by operability over extended periods of time corresponding to normal production runs without the build-up of excessive amounts of "fines" in the process system. In a further aspect the invention concerns, as a new manufacture, a granular ammonium sulfate fertilizer product of improved shape, enhanced mechanical integrity and of a novel composition. Because of its novel composition the new manufacture is specially adapted for use in fertilizing alkaline soils.

In the preparation of ammonium sulfate fertilizers, it is known to prepare crystalline or powdery products by first preparing aqueous solutions of ammonium sulfate, for example by direct reaction of ammonia and sulfuric acid in an aqueous medium or by the so-called "gypsum" process involving the reaction of calcium sulfate with ammonium carbonate. The resulting aqueous solutions of ammonium sulfate are then subjected to evaporation or crystallization techniques to prepare crystalline or powdery products. These so-called "wet" processes are characterized by high energy costs and the resulting products have many undesirable characteristics such as caking, dusting, etc., which interfere with the storage and handling of the product. Also, due to the small size of the particles, the problems of applying such products to the soil by broadcast techniques are aggravated by wind drift and related meteorlogical phenomena.

Accordingly, it has long been desired to provide ammonium sulfate fertilizers in a physical form similar to the well-known granulated ammonium phosphate and other granulated mixed fertilizer products. These granular ammonium phosphate products are typically produced in so-called "dry" processes where undersize product granules are coated with slurries or solutions of the fertilizer compounds until they reach product-size. An example of such dry process is the well-known "TVA" process which has achieved wide commercial acceptance.

However, the "dry" processes of the prior art have never been successfully adapted to the production of granular ammonium sulfate products, principally because of difficulty in obtaining an adherent coating of ammonium sulfate on the undersize granules and because of the generation of an undue proportion of small particles of ammonium sulfate ("fines") which cannot, on a continuous basis, be brought up to product-size by coating. As a result there is no granula ammonium sulfate product which is commercially available anywhere in the United States despite apparently concentrated research efforts in this direction and notwithstanding many statements, especially in the patent literature, that the processes therein described furnished commercially practicable processes for producing such fertilizers.

I have now discovered a process for continuously preparing a granular, substantially non-caking, free flowing ammonium sulfate fertilizer product under commercially practical conditions. Briefly, in accordance with my invention, I prepare such products in a typical "dry" process comprising contacting a recirculating load of undersize product granules in a granulation zone with a reaction mixture comprising sulfuric acid and ammonia under granulating conditions of moisture, temperature and residence time thereby to coat the undersize granules with the reaction mixture product, drying the coated granules, separating the dried granules into a product fraction and a recycle fraction, and recirculating the recycle fraction to the granulation zone. Commercially practical granulation of the reaction mixture is achieved by maintaining the mol ratio of ammonia to sulfuric acid in the reaction mixture to provide a coated granule stream effluent the granulation zone having a bulk pH of less than 2.5, preferably from about 1.9 to about 2.25.

As used herein the term "bulk pH" means the pH of a dissolved representative sample of the entire coated granule stream effluent the granulation zone, including undersize, oversize and product-size granules. The pH is measured at a dilution of 1 to 10, typically a ten gram sample dissolved in 100 grams water.

Adverting now to the drawing which, in conjunction with the following detailed description, will provide those skilled in the art with a clearer understanding of the invention and the preferred embodiments thereof:

There is shown a flow sheet of the process of the invention.

In accordance with the preferred practice of the process of the invention (referring now to the drawing) the process steps are carried out in equipment of the type commonly employed in the practice of the so-called "TVA" process for the preparation of granular ammonium phosphate and similar mixed fertilizers. A recirculating load of undersize product granules 1 is continuously fed into a granulator 2, typically a rotating drum which is slightly inclined and which imparts to the solids therein a rolling and tumbling motion. Ammonia feed stream 3 and sulfuric acid feed stream 4 provide a reaction mixture in the granulator which is contacted with the undersize granules and provides a coating thereon comprising ammonium sulfate and ammonium bisulfate. A granulator effluent stream 5 is withdrawn and fed to a dryer-cooler 6, typically an inclined rotating kiln-type vessel where the coated granules are contacted with an airstream 18 to remove moisture and to cool the granules to a temperature of about 100° F. The stream of dried, cooled granules 7 is then passed to a size classifier 8, typically a set of vibrating screens which separates the stream into an oversize fraction, a product size fraction and an undersize fraction. The stream of oversize particles 9 is fed to a crusher 10 and the crushed oversize material 11 is combined with the undersize stream 12 and the resulting stream of undersize and crushed oversize particles are recycled to the granulator. The product drawoff rate is balanced with the weight feed rates of ammonia and sulfuric acid to the process system by splitting the product size fraction 14 into product stream 15 and the balance of the product size fraction 13 is combined with the recycle stream and recycled to the granulator.

While the temperature, moisture and residence time conditions in the granulator are important in order to obtain granulation of the reactant mixture-recirculating load contacting mass, the selection of a particular suitable combination of these variables can be made more or less empirically by persons of ordinary skill in the art who will readily appreciate that granulating conditions of moisture, temperature and residence time can be selected according to their experience with other dry process for producing granular products such as granular ammonium phosphate. Thus, the temperature of the granulating mass must be maintained at somewhat below the thermal decomposition temperature of the product, in the case of the ammonium sulfate product described herein at from about 170–210° F., but yet high enough to vaporize sufficient water from the coated granules after they are formed to prevent the formation of a sticky, gummy mass in the granulator. The moisture content must be high enough to obtain coating of the granules and prevent undue dusting and fracturing but not high enough to cause the discrete coated granules to form balls or large agglomerates. Obviously, the undersize granules must remain in the granulation zone long enough to permit the formation of sufficient product-size granules to balance the product withdrawn from the system. However, even though the moisture, temperature, residence time and other parameters of the system are most judiciously optimized, a granular product still cannot be obtained on a practical continuous basis unless, according to the invention, the mol ratio of the reactants, ammonia and sulfuric acid are carefully controlled.

The size distribution of the coated granule stream leaving the granulator and the mechanical integrity of the granules thus produced are critically dependent upon the mol ratio of ammonia to sulfuric acid forming the reaction mixture in the granulator, which mixture coats the undersize granules and initiates new granulation nuclei. Thus, in accordance with the invention, it is necessary that the mol ratio of ammonia to sulfuric acid in the reaction mixture be controlled to provide for the formation of a coated granule stream effluent to the granulator having a bulk pH of less than 2.5, preferably and advantageously from about 1.9 to about 2.25. If the bulk pH of the granulator effluent stream ranges above 2.5 for any significant time an excessive amount of fines and dust will build up in the recirculating granule load causing eventual shut-down of the process due to plugging of transfer elevators, conveyors, dust separators and other such process equipment with dust and small particles.

The preferred lower limit of 1.9 is not critical in obtaining proper granulation; the mixture granulates well at a much lower pH, e.g., 1.5. However, at such low pH the nitrogen analysis of the product is unnecessarily reduced without a corresponding increase in granulation efficiency.

The critical reaction mixture conditions are stated herein in terms of the pH of the coated granule stream effluent the granulator rather than in terms of the mol ratio of the ammonia and sulfuric acid feeds to the granulator since the degree of contact of the reactants may vary according to the specific granulator geometry. Thus, in a preferred embodiment of the invention the ammonia feed is introduced into the rolling, tumbling bed of granules passing through the granulator by means of a sparge pipe immersed in the bed, the sulfuric acid feed being sprayed on top of the bed. The acid sprayed particles are then rolled and tumbled into contact with the ammonia feed, the reaction taking place in situ upon the surface of the granules, coating the granules with the reaction product. Apparently the mol ratio of reactants on the surface of the granules is on the average always somewhat less than stoichiometric since the coated granule stream leaving the granulator contains appreciable quantities of ammonium bisulfate ($NH_4HSO_4$) when the bulk pH of the stream is controlled as hereabove stated.

Obviously in a granulator design providing somewhat less efficient contact it may require a somewhat higher ammonia feed rate to maintain on the average the same mol ratio of reactants on the surfaces of the granules and vice versa. For this reason I prefer to state the critical reactant ratio in terms of the resulting bulk pH rather than in terms of the reactant feed rates. Alternatively, the critical reactant ratio could be stated in terms of the bisulfate content of the product, i.e. at least 10 and preferably 10–20 wt. percent, although this is a somewhat more cumbersome control point than pH which is rather easily measured.

Some insight into the dependence of particle size distribution upon reactant ratio is furnished by the fact that so long as the bulk pH is maintained within the above-stated limits, the pH of the smaller particles is not materially different, e.g. less than $\pm$ 0.1 pH units, from the pH of the larger particles. However, when the bulk pH is maintained for a time above 2.5 and the proportion of "fines" in the granulator effluent rises, it is noted that the pH of the smaller particles is significantly higher than that of the larger particles. Thus, apparently, the coating formed from the reaction mixture containing a lower ratio of ammonia to sulfuric acid is more tenacious and tends to remain as a coating on the undersize particle. At higher ratios of ammonia to sulfuric acid the reaction mixture product which contains a higher proportion of normal ammonium sulfate has a greater tendency to flake off the granule and form dust and a higher number of smaller size granulation nuclei which eventually plug the process equipment. The coating containing the higher proportion of ammonium bisulfate is more tenacious and the resulting granule is significantly more resistant to dusting and fracture than corresponding granules consisting essentially of normal ammonium sulfate.

The process and product of the invention is, therefore, to be carefully distinguished from the processes and products of the prior are wherein the production of essentially 100% normal ammonium sulfate in the reaction zone is a prime objective. As will appear hereafter in the examples, comparative tests run under otherwise comparable conditions within the granulator show that the typical commercial scale granulation plant can be maintained on-stream for essentially indefinite periods corresponding to normal production runs if the bulk pH of the granulator effluent stream is maintained within the hereabove specified limits, whereas if the pH is maintained at above these limits for an appreciable time, the recirculating granule system will begin to load up with fines within a matter of only a few minutes, forcing an eventual shut-down of the plant, sometimes in as little as an hour or so. Obviously, such processes are not commercially practicable, even though for short periods of time corresponding to test runs, they may be capable of producing minor proportions of acceptable product. According to the inventor's best information, there is presently no commercially satisfactory process for producing granular ammonium sulfate and the reason for the present lack of such a process is the build-up of fines in the circulating system of any of the so-called "dry" processes, whether such processes employ fluidized bed techniques or the more typical blunging or rotating drum granulator equipment.

The product of the above-described process is in the form of discrete granules, more or less regularly shaped. The granules are free-flowing, have significant mechanical strength and are highly resistant to fragmentation and dusting. A wide range of particle sizes and particle-size distribution are easily obtained using my process by varying the number of passes the granulation nuclei make through the granulation zone, which variation is controlled by the combination of screen sizes selected for the granule classifier as shown in the drawing. At present, it is preferred to prepare a product having a particle size range of $+10$ mesh to $-4$ mesh. This size distribution is most advantageously fitted to application by typical available farming equipment.

For comparison, the typical crystalline product available commercially is produced by a wet process involving direct reaction of ammonia and sulfuric acid in an aqueous medium followed by crystallization of the resultant solution of ammonium sulfate. The crystal particles of the prior art product are quite small in comparison to the typical product of my process and are definitely crystalline rather than granular. The crystalline product has a much greater tendency to cake and agglomerate which presents difficulties in storage and application. Moreover, even when not caked or agglomerated the crystalline product of the prior art is much more difficult to apply evenly by broadcast techniques.

Because of the substantially acidic nature of the product of my process, it is especially adapted for use in alkaline soils where its acidic properties are beneficially utilized in assisting to maintain a more neutral or even slightly acidic soil pH which promotes the uptake rate of conventional plant foods.

It is believed that the granular product of the process hereabove described constitutes a novel manufacture because of the presence of substantial quantities of ammonium bisulfate in the product composition which contributes to the shape and mechanical integrity of the particle and which also renders the product especially adapted for use in alkaline soils. The product is to be carefully distinguished from products of the prior art which consist essentially of normal ammonium sulfate and which cannot be produced on a commercial practical continuous basis because of the buildup of fines and dust in the circulating system.

For the better understanding of the invention and to illustrate the presently preferred embodiments thereof, the following examples are presented:

*Example 1*

A typical granular fertilizer plant employing the process shown in the drawing is employed according to the invention herein described to produce a granular ammonium sulfate product.

With the plant operating continuously the following equilibrium feed rates, flows and process conditions shown in Table A are established to continuously produce a typical granular ammonium sulfate product of the invention.

Employing these conditions the plant is operable without build-up of excessive fines and dust in the system over an essentially indefinite period corresponding to normal production runs.

thereafter as in Example 1 until a mechanical failure forced shut-down of the entire plant.

Having now fully described my invention and the preferred embodiments thereof, I claim:

1. In a continuous process for preparing a granular fertilizer product including contacting a recirculating stream of granulation nuclei comprising undersize particles of said product in a granulation zone with a reaction mixture providing the desired fertilizer composition, thereby to coat said nuclei with said composition, and repeating the contacting step until the coated nuclei reaches product-size, the improvements in combination with said process whereby a substantially non-caking, free flowing granular product containing a substantial proportion of ammonium sulfate is continuously prepared comprising contacting said nuclei with a reaction mixture comprising ammonia and sulfuric acid wherein the mol ratio of ammonia to sulfuric acid is adjusted to provide a coated nuclei stream effluent the granulation zone having a bulk pH of less than 2.5.

2. In a continuous process for preparing a granular fertilizer product including:
  (a) contacting a recirculating stream of granulation nuclei comprising undersize particles of said product with a reaction mixture providing the desired fertilizer composition, said contacting being carried out under granulation conditions of temperature, moisture and residence time in the granulation zone, thereby to coat said nuclei with the composition;
  (b) withdrawing said coated nuclei from the granulation zone;
  (c) drying and cooling said coated nuclei;
  (d) separating from said cooled dried nuclei a product-size fraction; and
  (e) recirculating the balance of the cooled, dried nuclei to the granulation zone

TABLE A

| | Rate [1] (lb./hr.) | Temp. (° F.) | Composition (Weight percent) | Remarks |
|---|---|---|---|---|
| Granulator Feeds: | | | | |
| Ammonia | 525 | Liq. | 100% | 160 p.s.i.g. |
| Sulfuric Acid | 1,575 | Ambient | 98% H$_2$SO$_4$ | |
| Water | 1,250 | Ambient | | As required to maintain granulating conditions. |
| Cooling Air | ([2]) | Ambient | | Granulator exit air plus unreacted NH$_3$ to NH$_3$ recovery. |
| Dry Flows: | | | | |
| Granulator Effluent | 35,000 | 200 | 10.21–11.64% Bisulfate | Bulk pH=1.95–2.10. |
| Cooler-Drier Effluent | 35,000 | 100 | 0.5% H$_2$O | |
| Oversize | 3,500 | | | |
| Product-size | 9,750 | | | |
| Undersize | 21,750 | | | |
| Total Recycle | 33,000 | | | |
| Product Withdrawn | 2,000 | | 19.54–19.69% N | +10 to −4 mesh. |

[1] Pounds per hour per ton per hour of product withdrawn unless indicated otherwise.
[2] 8,000 s.c.f.m.

*Example 2*

With the plant operating as in Example 1, the mol ratio of ammonia to sulfuric acid fed to the granulator was gradually changed and the bulk pH and size distribution of the granulator effluent stream was measured at 15 minute intervals. As the bulk pH rose to 2.60 the size distribution of the stream changed drastically such that the stream contained almost twice as much material passing the 30 mesh screen, over twice as much material passing the 50 mesh screen, and over four times the weight of material passing the 100 mesh screen. Within a matter of only about 30 minutes the product transfer elevators, conveyors, dust collectors and other such equipment were beginning to become plugged with dust and fines and it was necessary to immediately revert to a lower mol ratio of ammonia to sulfuric acid to prevent a complete plant shut-down. Upon reverting to a bulk pH of 2.0, the build-up of dust and fines in the circulating system ceased and the system returned to equilibrium conditions and was continuously operated the improvements in combination with said process whereby a free-flowing granular product containing a substantial proportion of ammonium sulfate is continuously prepared without the build-up of excessive fines in the recirculating granulation nuclei stream, which improvements comprise contacting said nuclei with a reaction mixture comprising ammonia and sulfuric acid, maintaining the mol ratio of ammonia to sulfuric acid in the reaction mixture to provide a coated nuclei stream effluent the granulation zone having a bulk pH of less than 2.5.

3. In a process for preparing an ammonium sulfate fertilizer product including contacting a recirculating load of undersize product granules in a granulation zone with a reaction mixture comprising sulfuric acid and ammonia under granulating conditions of moisture, temperature and residence time, thereby to coat the undersize granules with ammonium sulfate, drying the coated granules, separating the coated granules into a product fraction and a recycle fraction, and recirculating the recycle fraction for another pass through the granulation zone, the improvement in combination with said process whereby a free-flowing granular product containing a substantial proportion of ammonium sulfate is continuously prepared without build-up of excessive fines in the recirculating load, which improvement comprises maintaining the mol ratio of ammonia to sulfuric acid in the reaction mixture to provide a coated granule effluent stream from the granulation zone having a bulk pH of less than 2.5.

4. Improved process of claim 3 wherein the bulk pH is maintained at from about 1.9 to about 2.25.

5. A process for preparing a granular fertilizer product containing a substantial proportion of ammonium sulfate including in combination the steps of:
   (a) continuously recirculating a load of undersize granules through a rotating drum granulator;
   (b) continuously simultaneously introducing ammonia and sulfuric acid into said granulator to provide a coating for said undersize granules comprising ammonium sulfate and ammonium bisulfate;
   (c) continuously withdrawing an effluent stream of coated granules from the granulator;
   (d) maintaining the feed rates of ammonia and sulfuric acid to the granulator to provide a bulk pH of the granulator effluent stream of less than 2.5;
   (e) drying and cooling the granulator effluent stream;
   (f) separating the dried cooled stream into a product fraction and a recycle fraction; and
   (g) returning the recycle fraction to the granulator.

6. A process for preparing a granular fertilizer product containing a substantial proportion of ammonium sulfate including in combination the steps of:
   (a) continuously recirculating a load of undersize granules through a rotating drum granulator which imparts to the load passing therethrough a rolling and tumbling motion;
   (b) continuously introducing a feed stream of ammonia within the rolling tumbling load;
   (c) simultaneously continuously spraying a feed stream of sulfuric acid upon the rolling tumbling load, whereby sulfuric acid and ammonia react on the surfaces of the undersize granules and form thereon a coating comprising ammonium sulfate and ammonium bisulfate;
   (d) continuously withdrawing an effluent stream of coated granules comprising undersize, oversize and product size granules from the granulator;
   (e) maintaining the feed rates of ammonia and sulfuric acid to the granulator to provide a bulk pH of the granulator effluent stream of less than 2.5;
   (f) maintaining granulating conditions of temperature, moisture content and residence time within the granulator;
   (g) drying and cooling the granulator effluent stream;
   (h) separating the dried cooled stream into a product size fraction, an undersize fraction and an oversize fraction;
   (i) crushing the oversize fraction; and
   (j) recycling the crushed oversize and the undersize fractions to the granulator.

7. Process of claim 6 wherein the temperature of the granulator effluent stream is maintained at between about 170–210° F.

8. A new manufacture comprising discrete granules of a composition consisting essentially of ammonium sulfate and ammonium bisulfate in an amount from about 10 to about 20 parts per weight of ammonium bisulfate per 100 parts of said composition.

References Cited

UNITED STATES PATENTS

| | | | |
|---|---|---|---|
| 2,600,253 | 6/1952 | Lutz | 71—43 |
| 2,856,278 | 10/1958 | Bray et al. | 71—63 |
| 2,867,523 | 1/1959 | Lutz et al. | 71—61 |
| 3,114,624 | 12/1963 | Smith et al. | 71—54 |

DONALL H. SYLVESTER, *Primary Examiner.*

T. D. KILEY, *Assistant Examiner.*